United States Patent
Stalder et al.

(10) Patent No.: US 6,718,773 B2
(45) Date of Patent: Apr. 13, 2004

(54) METHOD FOR IGNITING A THERMAL TURBOMACHINE

(75) Inventors: Marcel Stalder, Klingnau (CH); Urs Benz, Gipf-Oberfrick (CH); Franz Joos, Weilheim-Bannholz (DE); Pirmin Schiessel, Unterehrendingen (CH); Jaan Hellat, Baden-Ruetihof (CH); Guenter Sybon, Gebenstorf (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/095,519

(22) Filed: Mar. 13, 2002

(65) Prior Publication Data

US 2003/0019215 A1 Jan. 30, 2003

(30) Foreign Application Priority Data

Mar. 16, 2001 (DE) .......................... 101 12 864

(51) Int. Cl.$^7$ .............................. F02C 7/264
(52) U.S. Cl. ....................... 60/776; 60/39.826
(58) Field of Search .................. 60/776, 39.826; 431/263

(56) References Cited

U.S. PATENT DOCUMENTS

| | | | | |
|---|---|---|---|---|
| 2,847,826 A | * | 8/1958 | Howes | 60/39.826 |
| 2,958,196 A | * | 11/1960 | Van Wie et al. | 60/39.826 |
| 2,967,224 A | | 1/1961 | Irwin | |
| 3,404,939 A | | 10/1968 | Saha | |
| 4,121,419 A | * | 10/1978 | Kuznetsov et al. | 60/39.826 |
| 4,192,139 A | * | 3/1980 | Buchheim | 60/39.826 |
| 4,205,524 A | | 6/1980 | Schirmer | |
| 4,288,978 A | * | 9/1981 | Wyatt | 60/39.826 |
| 5,002,483 A | | 3/1991 | Becker | |
| 5,344,310 A | | 9/1994 | Harbeck et al. | |
| 5,368,474 A | | 11/1994 | Welden | |
| 5,636,511 A | | 6/1997 | Pfefferle et al. | |
| 5,640,841 A | | 6/1997 | Crosby | |
| 6,322,353 B1 | * | 11/2001 | Stalder et al. | 431/263 |

FOREIGN PATENT DOCUMENTS

| | | |
|---|---|---|
| GB | 2 116 308 | 9/1983 |
| WO | 96/39578 | 12/1996 |

* cited by examiner

Primary Examiner—Michael Koczo
(74) Attorney, Agent, or Firm—Burns, Doane, Swecker & Mathis, L.L.P.

(57) ABSTRACT

In a method for igniting a thermal turbomachine, the turbomachine containing a combustion chamber (30), an ignition device (10), a fuel supply (60) and an air supply (70), and the ignition device (10) consisting of an ignition space (50) and of an ignitor (51) arranged in the ignition space (50), the fuel supply (60) and the air supply (70) discharging into the ignition space (50), and the ignition space (50) being connected to the combustion chamber (30) via a flame tube (40), prior to the ignition of the combustion chamber (30), an overall fuel/air mixture ratio $\Phi_{overall}=1/\lambda_{overall}$ greater than 1, with $\lambda_{overall}$ being the overall air ratio, is set in the flame tube (40) of the ignition device (10).

8 Claims, 1 Drawing Sheet

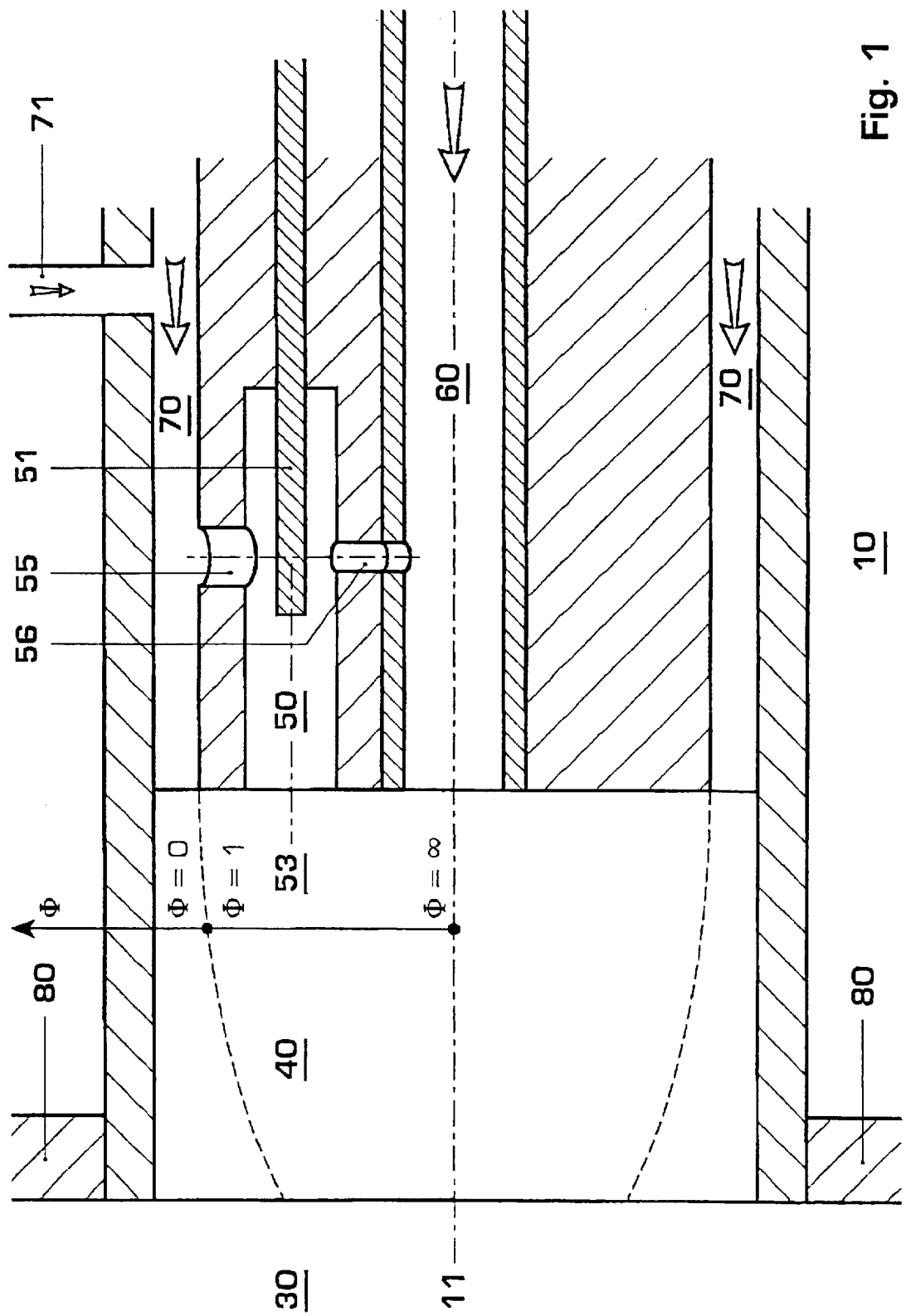

METHOD FOR IGNITING A THERMAL TURBOMACHINE

FIELD OF THE INVENTION

The present invention relates to a method for igniting fuel in a combustion chamber of a thermal turbomachine.

BACKGROUND OF THE INVENTION

In order to set a continuous chemical reaction in motion, the combustion chambers of furnaces and gas turbine plants are ignited generally by what are known as ignition aids. In this respect, in particular, electric spark or glow plugs are known, but a gas flame (ignition torch) is also often used for the ignition.

In this context, auxiliary burners are usually ignited first, these finally igniting the actual burners. Where gas turbines are concerned, the main fuel is sometimes also used for the ignition burners, that is to say fuel oil, kerosene or natural gas, depending on the application. Occasionally, however, easily storable auxiliary gases, such as, for example, propane, are also employed.

The ignition success achieved by means of the ignition aids depends on a multiplicity of factors. These include, inter alia, the inlet conditions of the combustion air, such as pressure, temperature and velocity, the ignition fuel used and its conditions, the geometry and nature of the combustion chamber and, finally, also the composition of the combustion air.

The ignition of the combustion chambers in thermal turbomachines, that is to say, for example, in gas turbines, by means of a spark plug or glow plug is described, inter alia, by A. Lefebvre in "Gas Turbine Combustion" (Arthur H. Lefebvre: *Gas Turbine Combustion* pages 222–225 and pages 232/233, Hemisphere Publishing Corporation, 1983).

A prerequisite for the functioning of the ignition device is, of course, that conditions prevail at the ignitor which make it possible to generate a stable and sufficiently strong ignition flame. In this case, in particular, mention must be made of the setting of the fuel/air ratio at the ignitor and of an expedient flow velocity in the region of the ignitor.

Particularly in the combustion chambers of gas turbines, these requirements often can be fulfilled only by the use of special ignition burners. The placing of the ignitor directly in the combustion space is automatically ruled out on account of the abovementioned criteria. Often, therefore, the ignitor is accommodated in a small ignition space, so that only a small volume has to be inflamed by initial ignition. A stable ignition flame is generated successively in a flame tube located downstream of this ignition space.

Such an ignition system for gas turbines is known from the publication EP-A1-992 661. Other ignitors are known, for example, from the publications U.S. Pat. Nos. 2,967,244, 3,404,939, 5,344,310 and 5,368,474 or from the international publication WO96/39578. A burner with an ignition device for gaseous fuels and oxygen is also described in the publication DD-241 457. Furthermore, a method for igniting the main flame of a combustion chamber is known from the publication DE-A1-4 320 429.

In ignition burners of this type, it is customary to use for the ignition flame lean mixtures with a fuel/air mixture ratio $\Phi_{overall}=1/\lambda_{overall}<1$, $\lambda_{overall}$ representing the air ratio balanced over the entire control space, that is to say a lean mixture being ignited. Locally, of course, mixture ratios from the rich to the lean stability limit are produced.

SUMMARY OF THE INVENTION

The aim of the invention is to avoid the disadvantages mentioned. The object on which the invention is based is to provide a method for igniting a thermal turbomachine, in which case a diffusion ignition flame with very good ignition properties is to be achieved over a wide stability range.

According to the invention, in a method for igniting a thermal turbomachine according to the preamble of claim 1, the object is achieved in that, prior to the ignition of the combustion chamber, an overall fuel/air mixture ratio $\Phi_{overall}=1/\lambda_{overall}$ greater than 1 prevails in the flame tube of the ignition device, with $\lambda_{overall}$ being the overall air ratio, the fuel/air mixture is ignited by means of the ignitor in the ignition space, and the flame and the remaining fuel/air mixture runs from the ignition space through the flame tube to the combustion chamber and ignites the combustion chamber there. In a particular embodiment, an overall fuel/air mixture ratio $\Phi_{overall}$ of 1 to 34 is set.

By the inflow velocity of the two media, air/fuel, being suitably selected higher than the flame velocity, the ignited fuel/air mixture then runs through the flame tube in the direction of the combustion chamber. There, by virtue of a cross-sectional widening, the flame is stabilized. The ignition of the main burners is subsequently carried out by means of the ignition flame burning in the combustion chamber. A method of this type leads to a highly stable diffusion flame which additionally has the property that, by being overenriched when it comes into contact with the air of the combustion chamber, it has good ignition properties, in that not only the hot gases of the ignition lance, but the additionally inflamed zones of the encased excess fuel burn in a diffusion-like manner.

In the type of ignition burner used, it is advantageous that the air surrounds the fuel annularly prior to ignition and the fuel is thereby locally diluted from outside. It may also be envisaged that the air is injected into the flame tube via a plurality of bores. Stabilization of the ignition flame may be carried out, as is known, by means of a free jet, by a borda jump or by vortex structures.

For the better ignition of the rich mixture which is present in the flame tube, it is advantageous, for the initial ignition of the ignition flame in the ignition space, to generate a lean fuel/air mixture and thus locally dilute the rich mixture there.

It may be envisaged, furthermore, that additional oxygen is added prior to and during the ignition of the ignition air. This leads to a reduction in the minimum ignition energy for igniting the mixture. This is of particular technical significance in the ignition of fuels which contain the especially ignitable $H_2$.

The flame tube can be used only once for igniting the combustion chamber and fuel and/or air can thereafter be supplied to the combustion chamber via the flame tube.

BRIEF DESCRIPTION OF THE DRAWING

The invention is explained in more detail below with reference to FIG. 1 showing an embodiment of a thermal turbomachine according to the invention with a casing, a combustion chamber, an ignition device and a fuel/air mixture ratio $\Phi$ in the flame tube.

DETAILED DESCRIPTION OF THE INVENTION

An example of an ignition device 10, by means of which the method according to the invention can be carried out, is illustrated in the single FIGURE. The ignition device 10 is mounted on the wall 80 of a combustion space. A flame tube 40 is open towards the interior of the combustion space 30. Fuel gas is supplied to the flame tube via one or more fuel gas lines 60, while the supply of air takes place via the ducts 70. Located on the end face of the flame tube 40 is the ignition space 50, in the interior of which the ignitor 51 is arranged. The ignition space 50 is connected to an air supply 70 and a fuel gas supply 60 by means of at least one connecting duct 55, 56. The connecting ducts 55, 56 may, of course, also be at an angle to the axis 53 of the ignition space 50 or have a lateral offset, in order to generate an expedient flow field in the ignition space 50. The set-up of this ignitor is known, in principle, from the publication EP-A1-992 661. This publication is an integral part of this description.

When the fuel gas and air supplies 60, 70 are acted upon by fuel gas and air, these flow for the most part into the flame tube 40. A part-stream of each medium flows through the supply orifices 55, 56 into the ignition space 50 and can be ignited there by means of the ignitor 51, for example a spark plug. Only a relatively small quantity of combustible mixture first has to be ignited in the ignition space 50, and the stoichiometry of the mixture present in the ignition space can be set independently of other parameters by means of the cross-section ratio of the supply orifices 55, 56 to one another. Moreover, the flow velocity in the ignition space 50 is also relatively low. Reliable ignition is therefore achieved even with low ignition energies. The pilot flame thus obtained, the intensity of which can be influenced by the geometry of the ignition space 50, flows out of the ignition space 50 into the flame tube 40. The fuel gas located there is reliably ignited by the pilot flame in a substantially greater concentration range than would be the case if only the low ignition energy generated, for example, by a spark plug or glow plug were available here. In the flame tube 40, then, the actual ignition flame is generated, which emerges into the combustion space 30 and has a sufficient intensity to ensure reliable ignition in the entire heat generator by cross ignition with other burners.

As is evident from FIG. 1, in the method according to the present invention locally different fuel/air mixture ratios $\Phi$ are achieved in the flame tube 40, where $\Phi=1/\lambda$, with $\lambda$ being the air ratio (stoichiometric ratio of air to fuel). Whereas there is pure air in a casing around the fuel, that is to say a mixture ratio of $\Phi=0$, in the middle of the flame tube 40 there is pure fuel, that is to say a mixture ratio of $\Phi=\infty$. A limit with a stoichiometric fuel/air mixture ratio of $\Phi=1$ is formed between these two zones (indicated by a dashed line). When the flame tube 40 is being filled, prior to ignition this zone with $\Phi=1$ widens in the direction of the combustion chamber 30 by diffusion in the flame tube 40. The mixture ratio $\Phi$ varies between the zone with $\Phi=0$ or $\Phi=1$ and the middle of the flame tube with $\Phi=\infty$.

According to the invention, in the method described here, during the ignition in the flame tube 40 an overall fuel/air mixture ratio of $\Phi_{overall}=1/\lambda_{overall}$ greater than 1 is achieved, with $\lambda_{overall}$ being the overall air ratio. Within the scope of the invention, it is conceivable, in principle, to set an overall fuel/air mixture ratio $\Phi_{overall}=1/\lambda_{overall}$ of between 1 and 34 prior to and during ignition. As a rule, it is kept constant within this range. A design of this type leads to a highly stable diffusion flame which additionally has the property that, by being overenriched when it comes into contact with the air of the combustion chamber 30, it has good ignition properties, in that not only the hot gases of the ignition lance, but the additionally inflamed zones of the encased excess fuel burn in a diffusion-like manner. The method according to the invention is distinguished, moreover, by an improved cross-ignition behavior of the main burners with one another.

For the better ignition of the rich mixture which is present in the flame tube 40, it is advantageous, for the initial ignition of the ignition flame in the ignition space 50, to generate a lean fuel/air mixture and thus locally dilute the rich mixture.

Stabilization of the ignition flame may be carried out, as is known, by means of a free jet, by a borda jump or by vortex structures.

It may also be envisaged that the flame tube is used only once for igniting the combustion chamber and that fuel and/or air is thereafter supplied to the combustion chamber via the flame tube.

It is further proposed that, prior to and during ignition, oxygen be additionally admixed to the thermal turbomachine through an oxygen supply 71 instead of additional ignition gases being admixed to the air supply 70 of the ignition burner 10. Oxygen may, of course, likewise be supplied to the fuel/air mixture of the combustion chamber 30. This is of particular technical importance in the combustion of fuels which contain especially ignitable hydrogen, for example $H_2/CO$ mixture, MBTU, LBTU fuel gases or liquid fuels, such as, for example, oils or alcohols.

The use of additional oxygen in the air or in the fuel/air mixture gives rise, as compared with (pure) air, to a reduction in the required minimum ignition energies of the fuels.

If MBTU fuel gases have hitherto been diluted with inert gases for reliable combustion, the additional oxygen improves the ignition behavior without dilution.

Of course, the addition of oxygen makes it easier to ignite ignition burners under correspondingly difficult conditions (low pressure, low temperatures, high flow velocity).

List of Reference Symbols

10 Ignition device
11 Center axis of the ignition device
30 Combustion space
40 Flame tube
50 Ignition space
51 Ignitor
53 Axis of symmetry of the ignitor
55 Connecting duct between air supply and ignition space
56 Connecting duct between fuel gas supply and ignition space
60 Fuel gas supply
70 Air supply
71 Oxygen supply
80 Combustion space wall

What is claimed is:

1. A method for igniting fuel in a combustion chamber of a thermal turbomachine, comprising: a combustion chamber, an ignition device, a fuel supply and an air supply, the ignition device including an ignition space and of an ignitor arranged in the ignition space, the fuel supply and the air supply discharging into the ignition space, and the ignition space being connected to the combustion chamber via a flame tube, wherein, prior to the ignition of the combustion chamber, an overall fuel/air mixture ratio $\Phi_{overall}=1/\lambda_{overall}$ greater than 1 is set in the flame tube, with $\lambda_{overall}$ being the overall air ratio, the fuel/air mixture is ignited by means of the ignitor in the ignition space, and the flame and the remaining fuel/air mixture runs from the ignition space through the flame tube to the combustion chamber and ignites the combustion chamber there, wherein the ignition operation is carried out by means of the ignitor in the ignition space with a lean fuel/air mixture.

2. The method as claimed in claim 1, wherein, prior to ignition, an overall fuel/air mixture ratio $\Phi_{overall}=1/\lambda_{overall}$ of between 1 and 34 is set in the flame tube.

3. The method as claimed in claim 1, wherein, prior to ignition, the air surrounds the fuel annularly in the flame tube and the fuel is thereby diluted locally.

4. The method as claimed in claim 1, wherein, prior to and during ignition, additional oxygen is added to the air.

5. The method as claimed in claim 1, wherein the ignition flame in the flame tube is stabilized by means of a free jet.

6. The method as claimed in claim 1, further comprising the steps of using the flame tube only once for igniting the combustion chamber, and supplying thereafter the fuel and/or air to the combustion chamber via the flame tube.

7. The method as claimed in claim 1, wherein the ignition flame in the flame tube is stabilized by a borda jump.

8. The method as claimed in claim 1, wherein the ignition flame in the flame tube is stabilized by a swirl.

* * * * *